United States Patent
Dudley et al.

(10) Patent No.: US 10,249,920 B2
(45) Date of Patent: Apr. 2, 2019

(54) BATTERY CELL ASSEMBLY

(71) Applicant: LG Chem, Ltd., Seoul (KR)

(72) Inventors: Scott Dudley, Commerce Township, MI (US); Robert Merriman, Shelby Township, MI (US); Todd Richard Brown, Armada, MI (US)

(73) Assignee: LG Chem, Ltd., Seoul (KR)

( * ) Notice: Subject to any disclaimer, the term of this patent is extended or adjusted under 35 U.S.C. 154(b) by 155 days.

(21) Appl. No.: 14/721,102

(22) Filed: May 26, 2015

(65) Prior Publication Data
US 2016/0351977 A1    Dec. 1, 2016

(51) Int. Cl.
*H01M 10/6556* (2014.01)
*H01M 2/02* (2006.01)
(Continued)

(52) U.S. Cl.
CPC ....... *H01M 10/6556* (2015.04); *H01M 2/021* (2013.01); *H01M 10/613* (2015.04);
(Continued)

(58) Field of Classification Search
CPC ........... H01M 10/0481; H01M 10/647; H01M 10/653; H01M 10/6552; H01M 10/6556; H01M 10/6553; H01M 10/6568
(Continued)

(56) References Cited

U.S. PATENT DOCUMENTS

| 8,852,781 B2 | 10/2014 | Merriman et al. |
| 2007/0138237 A1* | 6/2007 | Nishikawa .......... B21C 37/0803 228/112.1 |

(Continued)

FOREIGN PATENT DOCUMENTS

| JP | 2014078471 A | 5/2014 |
| KR | 20110126764 | 11/2011 |

(Continued)

OTHER PUBLICATIONS

U.S. Appl. No. 13/861,426, filed Apr. 12, 2013 entitled Battery Cell Assembly and Method for Manufacturing a Cooling Fin for the Battery Cell Assembly.
(Continued)

*Primary Examiner* — Jonathan G Jelsma
*Assistant Examiner* — Omar M Kekia
(74) *Attorney, Agent, or Firm* — Buckert Patent & Trademark Law Firm PC; John F. Buckert

(57) ABSTRACT

A battery cell assembly includes a pouch-type battery cell having a battery member, an external housing, and first and second electrical terminals. The external housing has a central housing portion and a peripheral lip member extending around a periphery of the central housing portion. The central housing portion encloses the battery member therein. The first and second electrical terminals are electrically coupled to the battery member and extend outwardly from the peripheral lip member. The assembly further includes a first tube disposed against the peripheral lip member of the external housing. The peripheral lip member extends around the first tube such that the first tube is at least partially disposed within a first interior region defined by the peripheral lip member.

19 Claims, 11 Drawing Sheets

(51) Int. Cl.
*H01M 10/647* (2014.01)
*H01M 10/613* (2014.01)
*H01M 10/653* (2014.01)

(52) U.S. Cl.
CPC ........ *H01M 10/647* (2015.04); *H01M 2/0275* (2013.01); *H01M 10/653* (2015.04)

(58) Field of Classification Search
USPC ........................................................ 429/120
See application file for complete search history.

(56) References Cited

U.S. PATENT DOCUMENTS

| | | | | |
|---|---|---|---|---|
| 2011/0008665 | A1* | 1/2011 | Yoon ................... | H01M 2/0265 429/120 |
| 2011/0151300 | A1* | 6/2011 | Herrmann ......... | H01M 10/0413 429/120 |
| 2013/0045410 | A1* | 2/2013 | Yang ................... | H01M 10/625 429/120 |
| 2013/0071696 | A1* | 3/2013 | Kim .................... | H01M 2/0275 429/7 |
| 2014/0120390 | A1 | 5/2014 | Merriman et al. | |
| 2014/0272496 | A1* | 9/2014 | Han .................... | H01M 10/625 429/83 |
| 2015/0111075 | A1 | 4/2015 | Yum et al. | |

FOREIGN PATENT DOCUMENTS

| | | |
|---|---|---|
| KR | 101413489 | 10/2013 |
| KR | 20140062603 | 5/2014 |
| KR | 20140123901 | 10/2014 |
| KR | 20150033177 A | 4/2015 |

OTHER PUBLICATIONS

U.S. Appl. No. 14/488,349, filed Sep. 17, 2014 entitled Battery Cell Assembly and Method for Manufacturing a Cooling Fin for the Battery Cell Assembly.

* cited by examiner

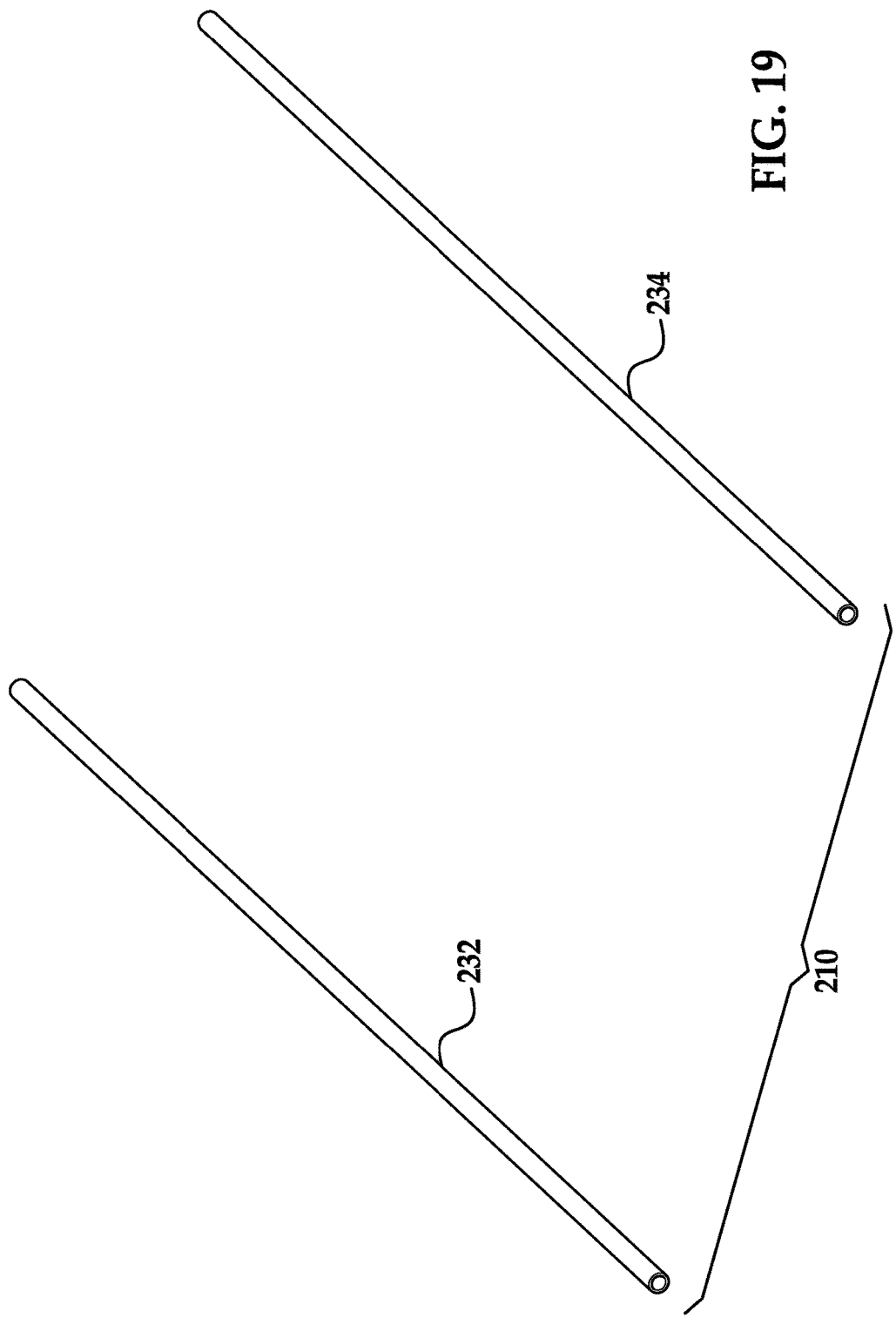

BATTERY CELL ASSEMBLY

BACKGROUND

The inventors have recognized a need for improved battery cell assembly having a pouch-type battery cell with a tube enclosed within a portion of a housing of the pouch-type battery cell that receives a fluid for cooling the pouch-type battery cell.

SUMMARY

A battery cell assembly in accordance with an exemplary embodiment is provided. The battery cell assembly includes a pouch-type battery cell having a battery member, an external housing, and first and second electrical terminals. The external housing has a central housing portion and a peripheral lip member extending around a periphery of the central housing portion. The central housing portion encloses the battery member therein. The first and second electrical terminals are electrically coupled to the battery member and extend outwardly from the peripheral lip member. The battery cell assembly further includes a first tube being disposed against the peripheral lip member of the external housing. The peripheral lip member extends around the first tube such that the first tube is at least partially disposed within a first interior region defined by the peripheral lip member.

BRIEF DESCRIPTION OF THE DRAWINGS

FIG. 19 is a schematic of first and second tubes utilized in the battery cell assembly of FIG. 11.

DETAILED DESCRIPTION

Figure 1:
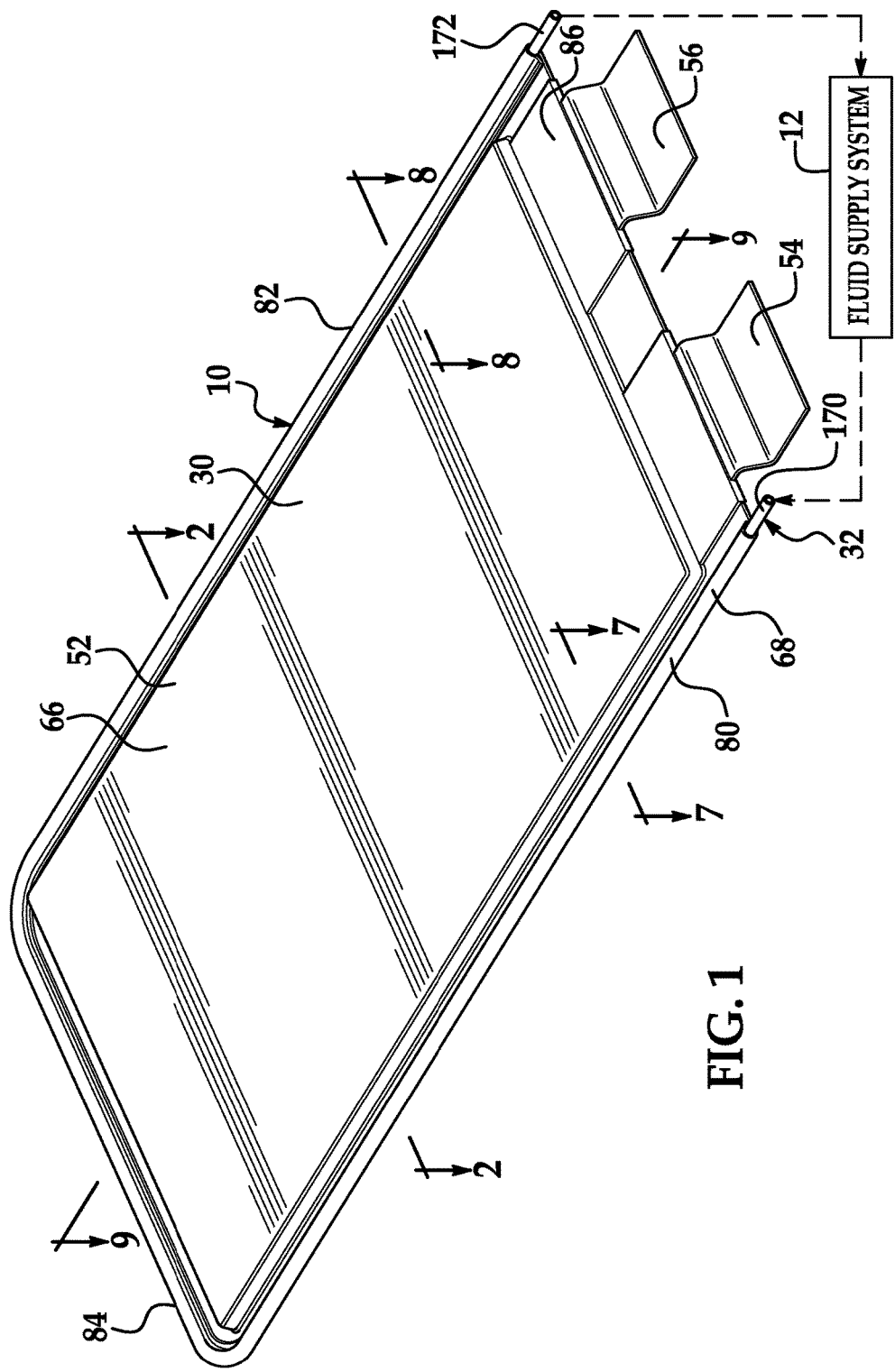
FIG. 1 is a schematic of a battery cell assembly in accordance with an exemplary embodiment coupled to a fluid supply system.

Referring to FIGS. 1-10, a battery cell assembly 10 in accordance with an exemplary embodiment is provided. The battery cell 10 is fluidly coupled to a fluid supply system 12. The battery cell assembly 10 includes a pouch-type battery cell 30 and a tube 32. An advantage of the battery cell assembly 10 is that the tube 32 is disposed within a portion of the external housing 52 of the pouch-type battery cell 30 and transfers heat energy from the pouch-type battery cell 30 to a fluid flowing through the tube 32 to cool the pouch-type battery cell 30.

Figure 2:
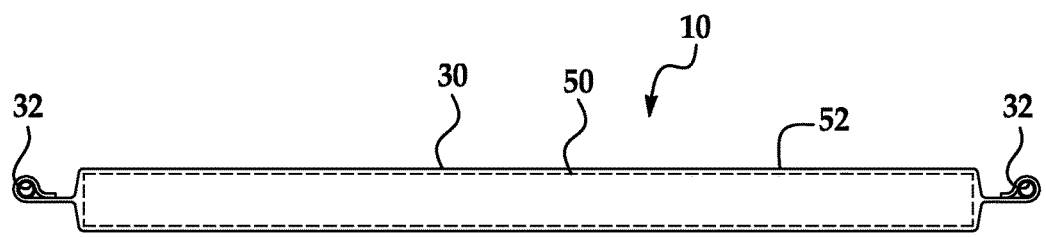
FIG. 2 is a cross-sectional schematic of the battery cell assembly of FIG. 1 taken along lines 2-2 in FIG. 1.
Figure 3:
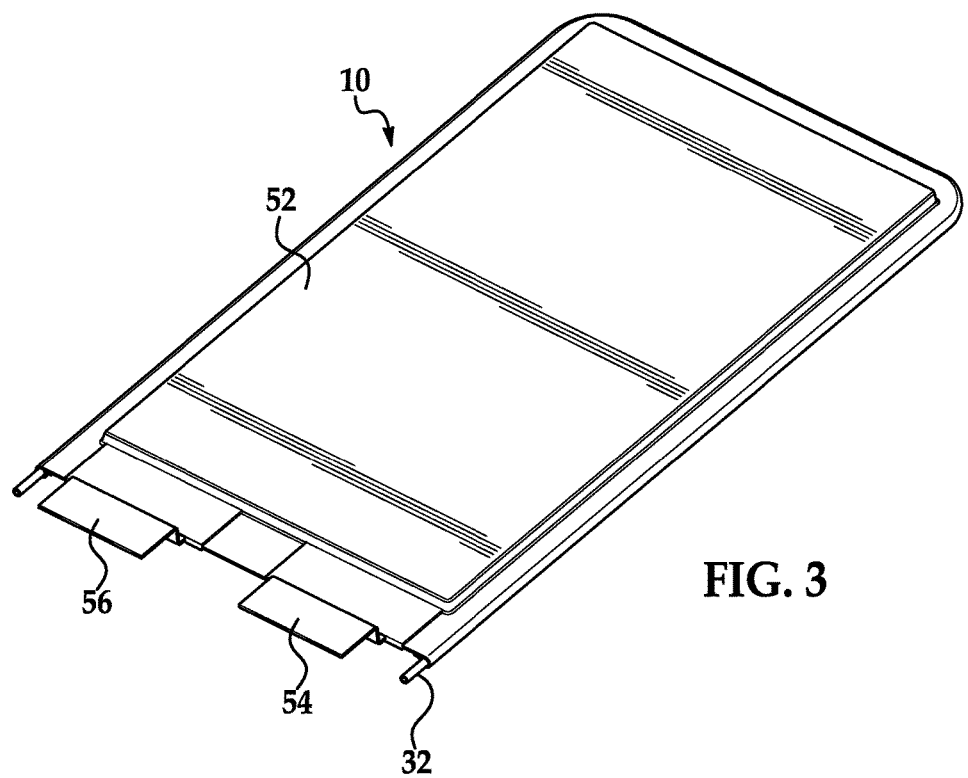
FIG. 3 is another schematic of the battery cell assembly of FIG. 1.
Figure 4:
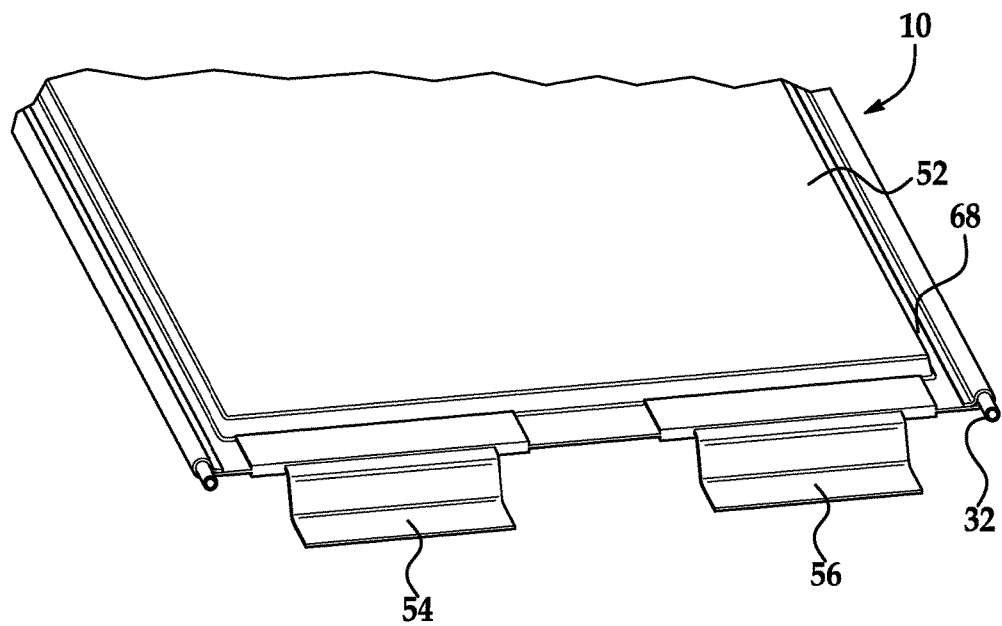
FIG. 4 is an enlarged schematic of a portion of the battery cell assembly of FIG. 1.
Figure 5:
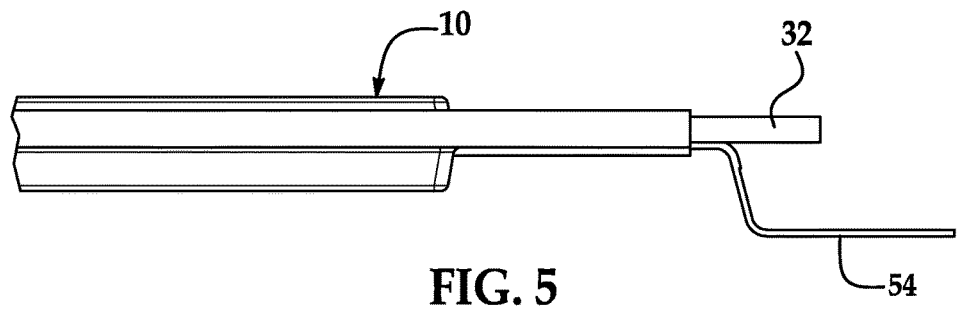
FIG. 5 is another enlarged schematic of a portion of the battery cell assembly of FIG. 1.
Figure 6:
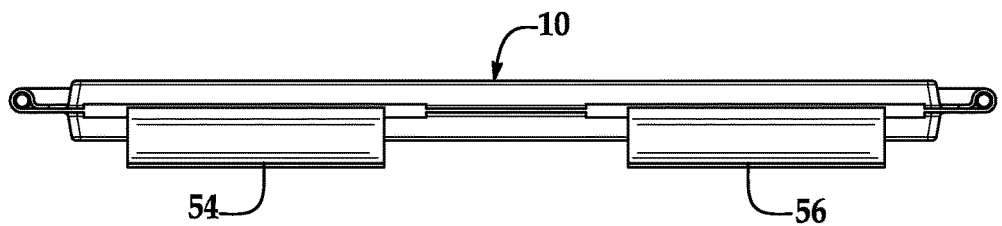
FIG. 6 is a schematic of a first end of the battery cell assembly of FIG. 1.

Referring to FIGS. 1 and 2, the pouch-type battery cell 30 includes a battery member 50, an external housing 52, and first and second electrical terminals 54, 56. The battery member 50 is substantially rectangular-shaped. In an exemplary embodiment, the battery member 50 is a lithium-ion battery member. Further, in an alternative embodiment, the battery member 50 could be cylindrically shaped.

The external housing 52 has a central housing portion 66 and a peripheral lip member 68 extending around a periphery of the central housing portion 66. The central housing portion 66 encloses the battery member 50 therein. In an exemplary embodiment, the external housing 52 is constructed of a sheet, which sheet is formed by laminating a polymer film on a metal sheet made of aluminum for example.

The peripheral lip member 68 includes peripheral lip portions 80, 82, 84, 86. The peripheral lip portions 80, 82 extend substantially parallel to one another. The peripheral lip portions 84, 86 extend substantially parallel to one another and substantially perpendicular to the peripheral lip portions 80, 82.

Figure 7:
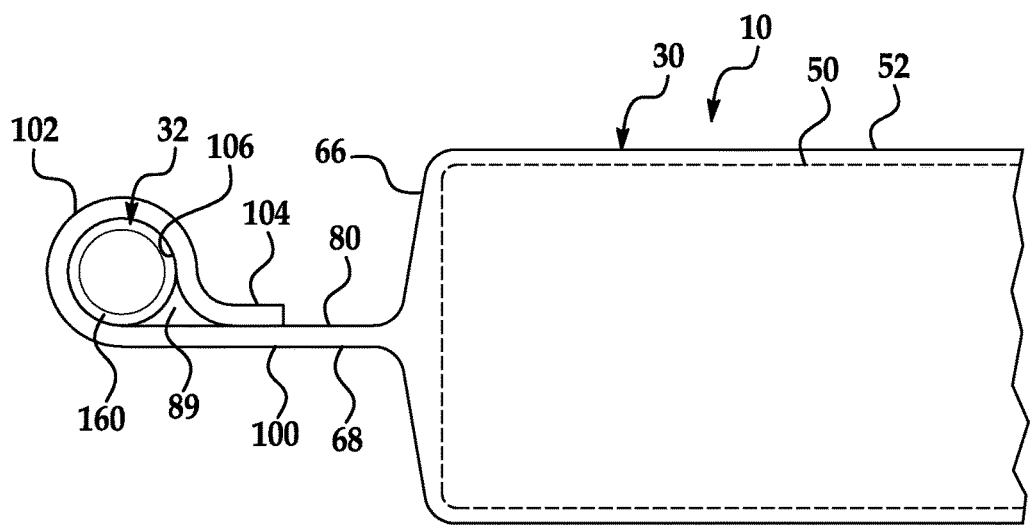
FIG. 7 is an enlarged cross-sectional schematic of a portion of the battery cell assembly of FIG. 1 taken along lines 7-7 in FIG. 1.
Figure 10:
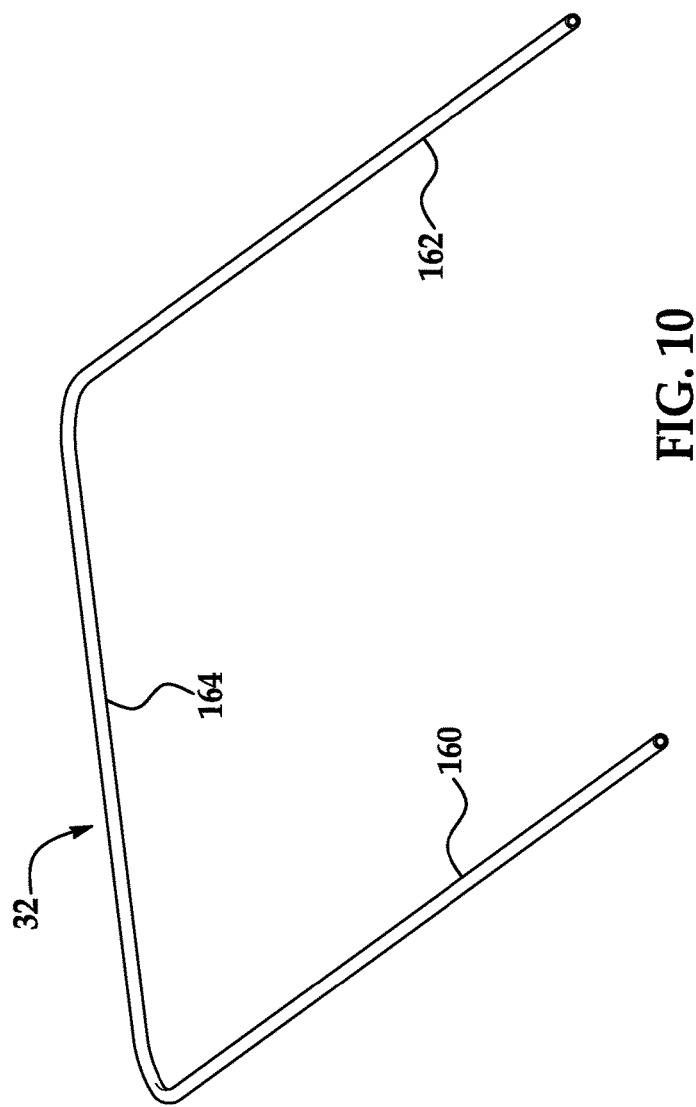
FIG. 10 is a schematic of a tube utilized in the battery cell assembly of FIG. 1.

Referring to FIGS. 7 and 10, the peripheral lip portion 80 includes an extension portion 100, an arcuate-shaped portion 102, and an end portion 104. The arcuate-shaped portion 102 is coupled to and disposed between the extension portion 100 and the end portion 104. The extension portion 100 extends outwardly from the central housing portion 66 in a first direction. The arcuate-shaped portion 102 is disposed against and wrapped around a portion of a periphery of a first tube portion 160 of the tube 32. The end portion 104 is coupled to the extension portion 100 such that the peripheral lip portion 80 defines an interior space 106, and the first tube portion 160 of the tube 32 is disposed within the interior space 106. In an exemplary embodiment, the end portion 104 is welded to the extension portion 100 such that the peripheral lip portion 80 defines the interior space 106. In an alternative embodiment, the end portion 104 is adhered via an adhesive to the extension portion 100 such that the peripheral lip portion 80 defines the interior space 106.

Figure 8:
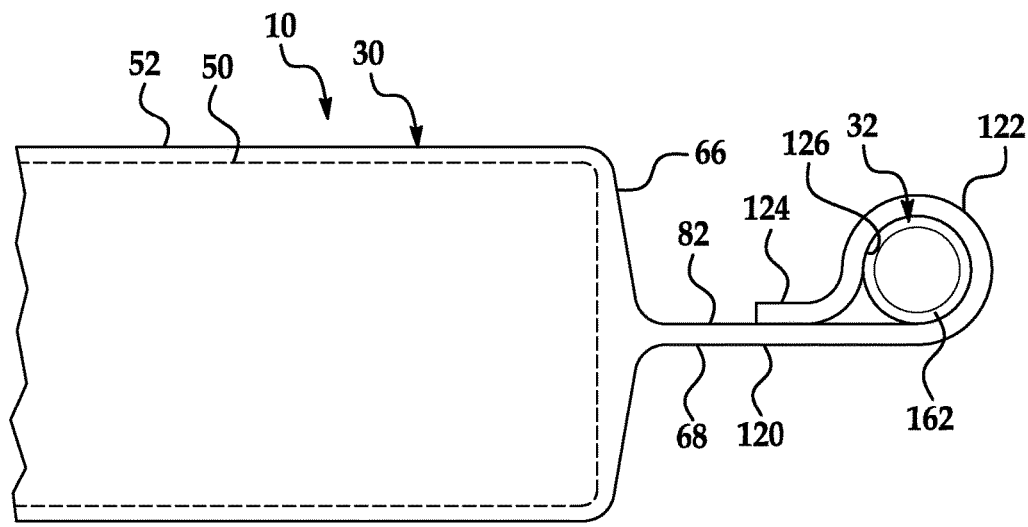
FIG. 8 is an enlarged cross-sectional schematic of another portion of the battery cell assembly of FIG. 1 taken along lines 8-8 in FIG. 1.

Referring to FIGS. 8 and 10, the peripheral lip portion 82 includes an extension portion 120, an arcuate-shaped portion 122, and an end portion 124. The arcuate-shaped portion 122 is coupled to and disposed between the extension portion 120 and the end portion 124. The extension portion 120 extends outwardly from the central housing portion 66 in a second direction opposite to the first direction. The arcuate-shaped portion 122 is disposed against and wrapped around a portion of a periphery of the second tube portion 162 of the tube 32. The end portion 124 is coupled to the extension portion 120 such that the peripheral lip portion 82 defines an interior space 126, and the second tube portion 162 of the tube 32 is disposed within the interior space 126. In an exemplary embodiment, the end portion 124 is welded to the extension portion 120 such that the peripheral lip portion 82 defines the interior space 126. In an alternative embodiment, the end portion 124 is adhered via an adhesive to the extension portion 120 such that the peripheral lip portion 82 defines the interior space 126.

Figure 9:
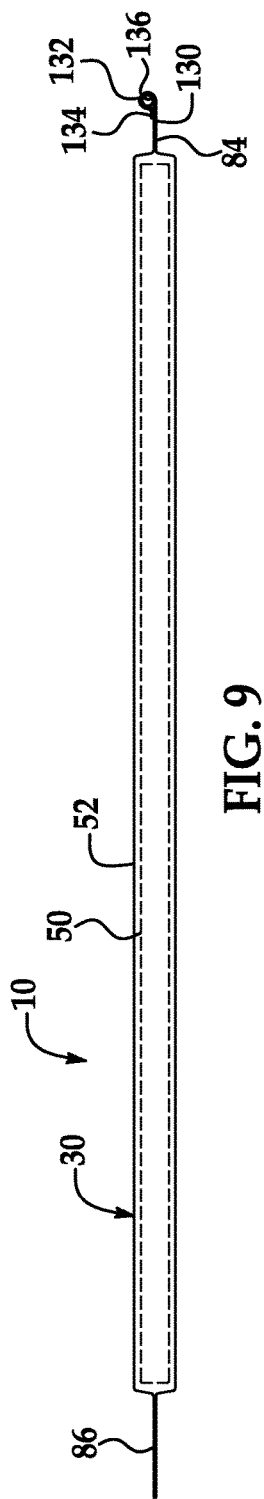
FIG. 9 is a cross-sectional schematic of the battery cell assembly of FIG. 1 taken along lines 9-9 in FIG. 1.

Referring to FIGS. 1, 9 and 10, the peripheral lip portion 84 includes an extension portion 130, an arcuate-shaped portion 132, and an end portion 134. The arcuate-shaped portion 132 is coupled to and disposed between the extension portion 130 and the end portion 134. The extension portion 130 extends outwardly from the central housing portion 66 in a third direction perpendicular to the first direction. The arcuate-shaped portion 132 is disposed against and wrapped around a portion of a periphery of the third tube portion 164 (shown in FIG. 10) of the tube 32. The end portion 134 is coupled to the extension portion 130 such that the peripheral lip portion 84 defines an interior space 136, and the third tube portion 164 of the tube 32 is disposed within the interior space 136. In an exemplary embodiment, the end portion 134 is welded to the extension portion 130 such that the peripheral lip portion 84 defines the interior space 136. In an alternative embodiment, the end portion 134 is adhered via an adhesive to the extension portion 130 such that the peripheral lip portion 84 defines the interior space 136.

Referring to FIGS. 1 and 2, the first and second electrical terminals 54, 56 are electrically coupled to the battery member 50 and extend outwardly from the peripheral lip portion 86 of the peripheral lip member 68. The battery member 50 generates an operational voltage between the first and second electrical terminals 54, 56.

Referring to FIGS. 7-10, the tube 32 is disposed against the peripheral lip member 68 of the external housing 52. The tube 32 is at least partially disposed within a first interior region 89 (e.g., comprising the internal spaces 106, 126, 136) defined by the peripheral lip member 68. In an exemplary embodiment, the tube 32 is constructed of aluminum. Of course, in an alternative embodiment, the tube 32 could be constructed of other thermally conductive materials such as copper, steel, stainless steel, or plastic for example. The tube 32 is configured to receive heat energy from the pouch-type battery cell 30 and to transfer at least a portion of the received heat energy to a fluid flowing through the tube 32 to cool the pouch-type battery cell 30. The tube 32 includes first, second, and third tube portions 160, 162, 164. The first and second tube portions 160, 162 extends substantially parallel to one another. The third tube portion 164 extends between the first and second tube portions 160, 162 substantially perpendicular to the first and second tube portions 160, 162.

Referring to FIGS. 1 and 7, the first tube portion 160 is disposed against the peripheral lip portion 80. The peripheral lip portion 80 extends around the first tube portion 160 such that the first tube portion 160 is at least partially disposed within the interior space 106 defined by the peripheral lip portion 80. The first tube portion 160 includes an end portion 170 that extends outwardly from the peripheral lip member 68 and is not enclosed by the peripheral lip member 68.

Referring to FIGS. 1 and 8, the second tube portion 162 is disposed against the peripheral lip portion 82. The peripheral lip portion 82 extends around the second tube portion 162 such that the second tube portion 162 is at least partially disposed within the interior space 126 defined by the peripheral lip portion 82. The second tube portion 162 includes an end portion 172 that extends outwardly from the peripheral lip member 68 and is not enclosed by the peripheral lip member 68.

Referring to FIGS. 1 and 9, the third tube portion 164 is disposed against the peripheral lip portion 84. The peripheral lip portion 84 extends around the third tube portion 164 such that the third tube portion 164 is at least partially disposed within the interior space 136 defined by the peripheral lip portion 84.

Referring to FIG. 1, the fluid supply system 12 pumps a fluid from the fluid supply system 12 through an interior portion of the tube 32, and the tube 32 transfers heat energy received from the pouch-type battery cell 30 to the fluid flowing therethrough to cool the pouch-type battery cell 30. Thereafter, the fluid is routed from the tube 32 back to the fluid supply system 12 which cools the fluid. In an alternative embodiment, the fluid supply system 12 could heat the fluid such that heat energy in the fluid flowing through the tube 32 could be transferred to the tube 32, and further transferred from the tube 32 to the pouch-type battery cell 30 to heat the pouch-type battery cell 30.

Referring to FIGS. 11-19, a battery cell assembly 210 in accordance with another exemplary embodiment is provided. The battery cell 210 is fluidly coupled to a fluid supply system 212. The battery cell assembly 210 includes a pouch-type battery cell 230 and tube 232, 234. An advantage of the battery cell assembly 210 is that the tubes 232, 234 are disposed within portions of the external housing 252 of the pouch-type battery cell 230 and transfers heat energy from the pouch-type battery cell 230 to fluid flowing through each of the tubes 232, 234 to cool the pouch-type battery cell 230.

Figure 11:
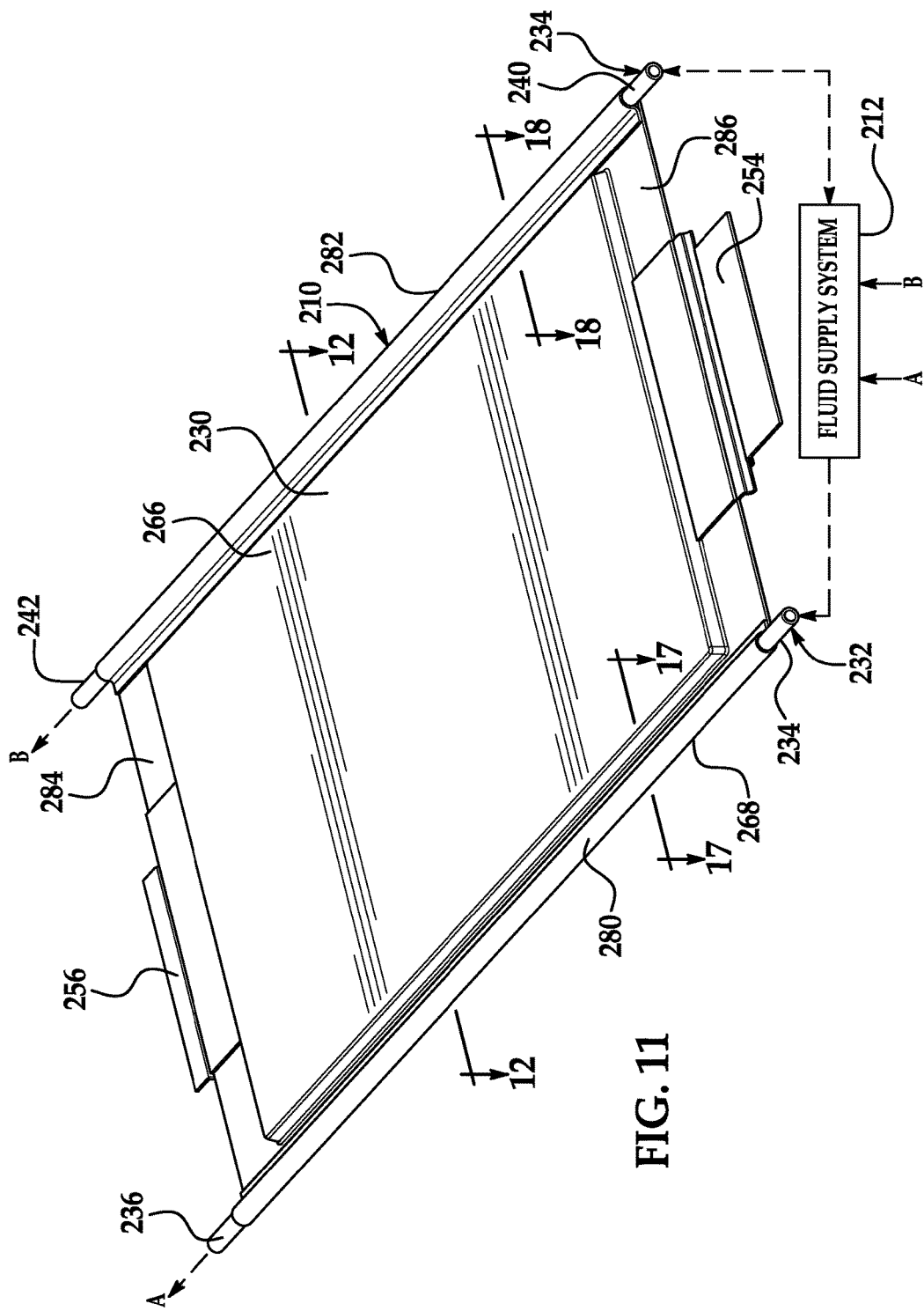
FIG. 11 is a schematic of a battery cell assembly in accordance with another exemplary embodiment coupled to a fluid supply system.
Figure 12:
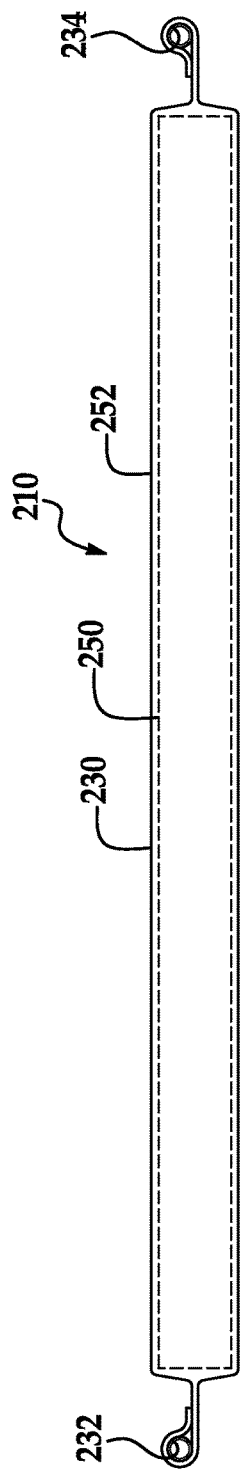
FIG. 12 is a cross-sectional schematic of the battery cell assembly of FIG. 11 taken along lines 12-12 in FIG. 11.
Figure 13:
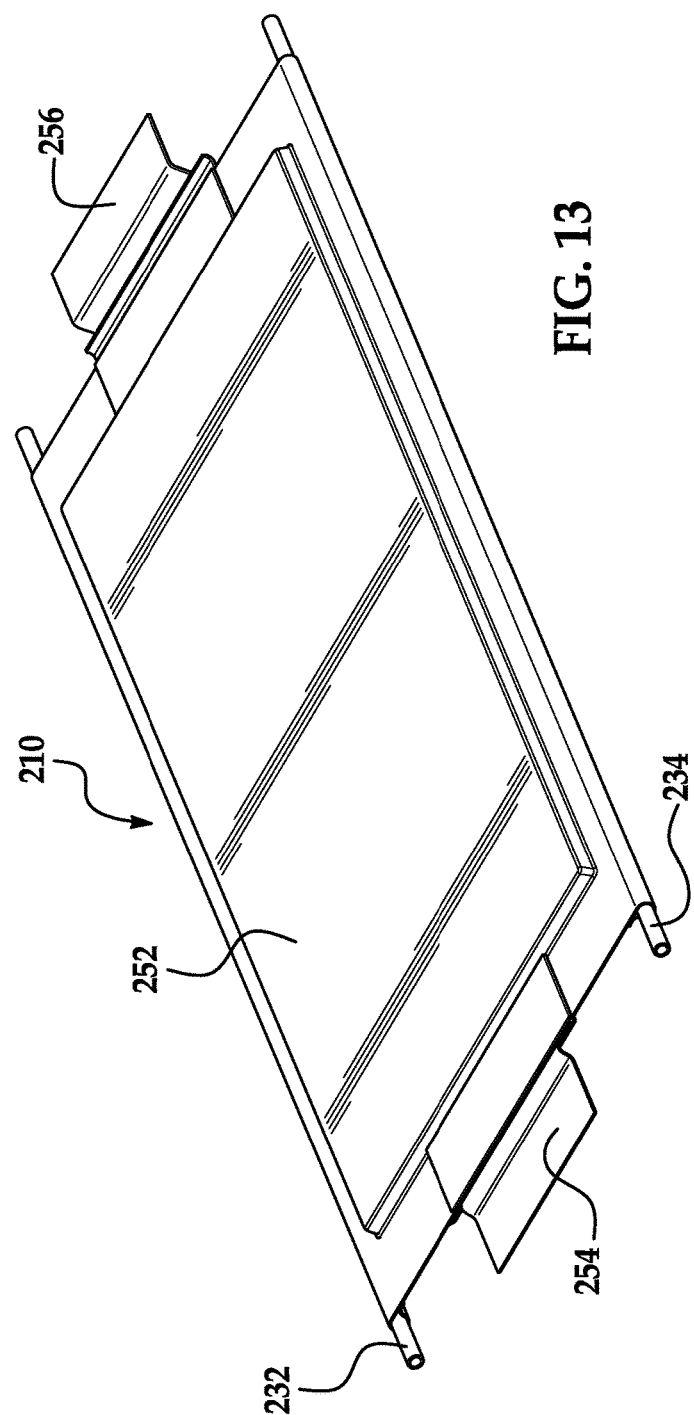
FIG. 13 is another schematic of the battery cell assembly of FIG. 11.
Figure 14:
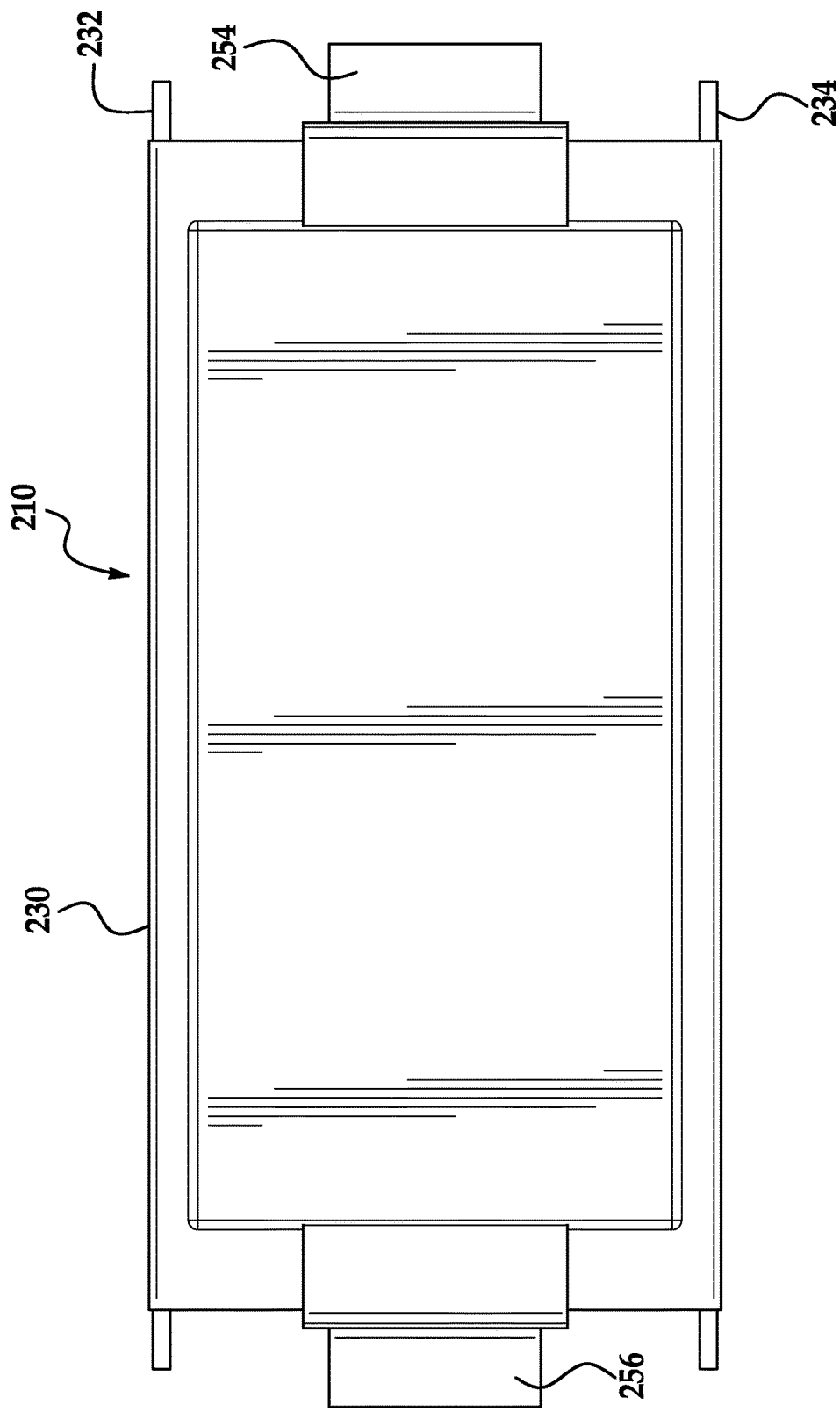
FIG. 14 is a schematic of a bottom side of the battery cell assembly of FIG. 11.
Figure 15:
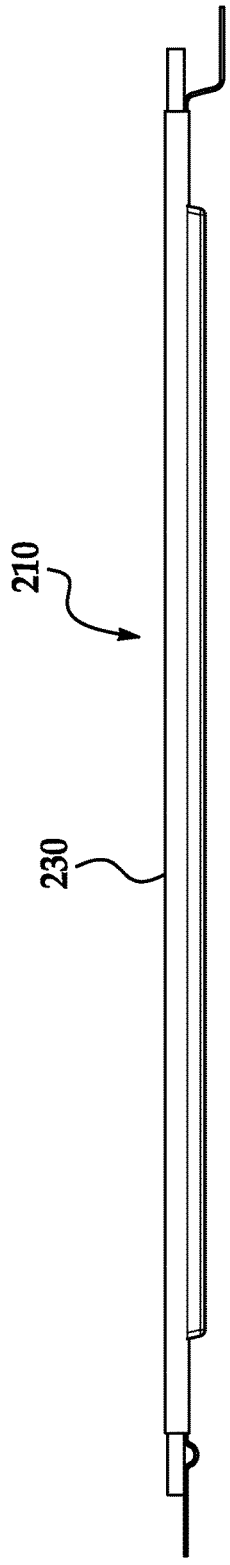
FIG. 15 is a schematic of a first side of the battery cell assembly of FIG. 11.
Figure 16:
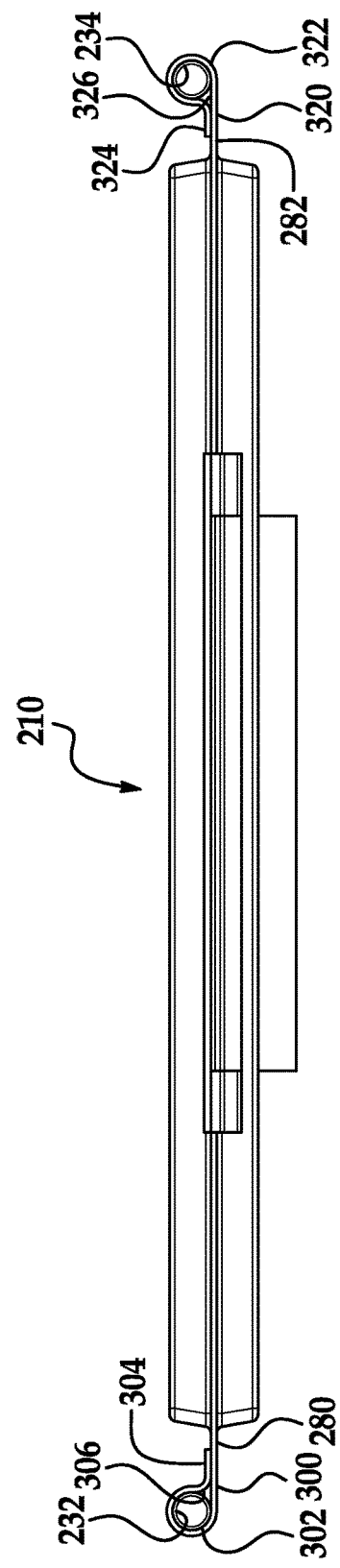
FIG. 16 is a schematic of a first end of the battery cell assembly of FIG. 11.

Referring to FIGS. 11 and 12, the pouch-type battery cell 230 includes a battery member 250, an external housing 252, and first and second electrical terminals 254, 256. The battery member 250 is substantially rectangular-shaped. In an exemplary embodiment, the battery member 250 is a lithium-ion battery member. Further, in an alternative embodiment, the battery member 250 could be cylindrically shaped.

The external housing 252 has a central housing portion 266 and a peripheral lip member 268 extending around a periphery of the central housing portion 266. The central housing portion 266 encloses the battery member 250 therein. In an exemplary embodiment, the external housing 252 is constructed of a sheet, which sheet is formed by laminating a polymer film on a metal sheet made of aluminum for example.

The peripheral lip member 268 includes peripheral lip portions 280, 282, 284, 286. The peripheral lip portions 280, 282 extend substantially parallel to one another. The peripheral lip portions 284, 286 extend substantially parallel to one another and substantially perpendicular to the peripheral lip portions 280, 282.

Figure 17:
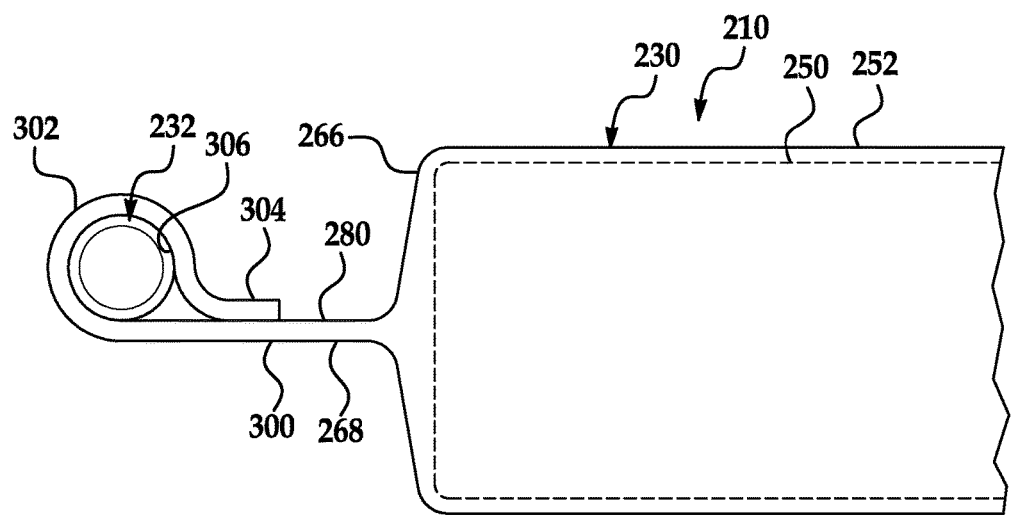
FIG. 17 is an enlarged schematic of a portion of the battery cell assembly of FIG. 11 taken along lines 17-17 in FIG. 11.

Referring to FIGS. 17 and 19, the peripheral lip portion 280 includes an extension portion 300, an arcuate-shaped portion 302, and an end portion 304. The arcuate-shaped portion 302 is coupled to and disposed between the extension portion 300 and the end portion 304. The extension portion 300 extends outwardly from the central housing portion 266 in a first direction. The arcuate-shaped portion 302 is disposed against and wrapped around a portion of a periphery of the tube 232. The end portion 304 is coupled to the extension portion 300 such that the peripheral lip portion 280 defines an interior space 306, and the tube 232 is disposed within the interior space 306. In an exemplary embodiment, the end portion 304 is welded to the extension portion 300 such that the peripheral lip portion 280 defines the interior space 306. In an alternative embodiment, the end portion 304 is adhered via an adhesive to the extension portion 300 such that the peripheral lip portion 280 defines the interior space 306.

Figure 18:
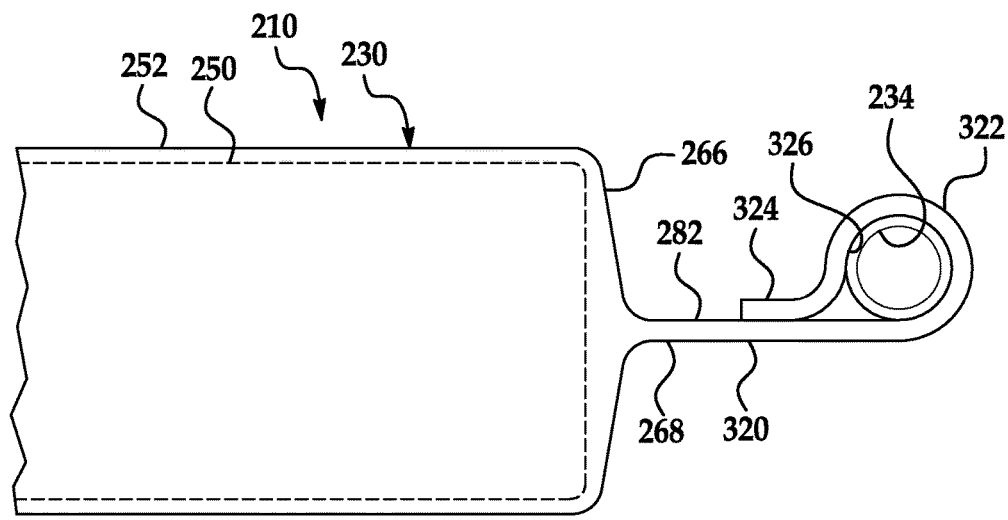
FIG. 18 is an enlarged schematic of another portion of the battery cell assembly of FIG. 11 taken along lines 18-18 in FIGS. 11.

Referring to FIGS. 18 and 19, the peripheral lip portion 282 includes an extension portion 320, an arcuate-shaped portion 322, and an end portion 324. The arcuate-shaped portion 322 is coupled to and disposed between the extension portion 320 and the end portion 324. The extension portion 320 extends outwardly from the central housing portion 266 in a second direction opposite to the first direction. The arcuate-shaped portion 322 is disposed against and wrapped around a portion of a periphery of the tube 232. The end portion 324 is coupled to the extension portion 320 such that the peripheral lip portion 282 defines an interior space 326, and the tube 232 is disposed within the interior space 326. In an exemplary embodiment, the end portion 324 is welded to the extension portion 320 such that the peripheral lip portion 282 defines the interior space 326. In an alternative embodiment, the end portion 324 is adhered via an adhesive to the extension portion 300 such that the peripheral lip portion 282 defines the interior space 326.

Referring to FIGS. 11 and 12, the first and second electrical terminals 254, 256 are electrically coupled to the battery member 250 and extend outwardly from the peripheral lip portions 284, 286, respectively, of the peripheral lip member 268. The battery member 250 generates an operational voltage between the first and second electrical terminals 254, 256.

Referring to FIGS. 12, 17 and 19, the tube 232 is disposed against the peripheral lip portion 280 of the peripheral lip member 268 of the external housing 252. The tube 232 is at least partially disposed within a first interior region 306 defined by the peripheral lip portion 280 of the peripheral lip member 268. In an exemplary embodiment, the tube 232 is constructed of aluminum. Of course, in an alternative embodiment, the tube 232 could be constructed of other thermally conductive materials such as copper, steel, stainless steel, or plastic for example. The tube 232 is configured to receive heat energy from the pouch-type battery cell 230 and to transfer at least a portion of the received heat energy to a fluid flowing through the tube 232 to cool the pouch-type battery cell 230. The tube 232 includes end portions 234, 236 that extend outwardly from first and second ends, respectively, of the peripheral lip member 268 and is not enclosed by the peripheral lip member 268.

Referring to FIGS. 12, 18, and 19, the tube 234 is disposed against the peripheral lip portion 282 of the peripheral lip member 282 of the external housing 252. The tube 234 is at least partially disposed within the interior space 326 defined by the peripheral lip member 268. In an exemplary embodiment, the tube 234 is constructed of aluminum. Of course, in an alternative embodiment, the tube 234 could be constructed of other thermally conductive materials such as copper, steel, stainless steel, or plastic for example. The tube 234 is configured to receive heat energy from the pouch-type battery cell 230 and to transfer at least a portion of the received heat energy to a fluid flowing through the tube 234 to cool the pouch-type battery cell 230. The tube 234 includes end portions 240, 242 that extend outwardly from first and second ends, respectively, of the peripheral lip member 268 and is not enclosed by the peripheral lip member 268.

Referring to FIG. 11, the fluid supply system 212 pumps a fluid from the fluid supply system 212 through the tube 232, and the tube 232 transfers heat energy received from the pouch-type battery cell 230 to the fluid flowing therethrough to cool the pouch-type battery cell 230. Thereafter, the fluid is routed from the tube 232 back to the fluid supply system 212 which cools the fluid. Further, the fluid supply system 212 pumps fluid from the fluid supply system 212 through the tube 234, and the tube 234 transfers heat energy received from the pouch-type battery cell 230 to the fluid flowing therethrough to cool the pouch-type battery cell 230. Thereafter, the fluid is routed from the tube 234 back to the fluid supply system 212 which cools the fluid. In an alternative embodiment, the fluid supply system 12 could heat the fluid such that heat energy in the fluid could be transferred to the tubes 232, 234, and further transferred from the tubes 232, 234 to the pouch-type battery cell 230 to heat the pouch-type battery cell 230.

The battery cell assemblies 10, 210 each provide a substantial advantage over other battery cell assemblies. In particular, the battery cell assemblies 10, 210 each provide a technical effect of utilizing at least one tube at least partially enclosed within a pouch-type battery cell that receives fluid therethrough to cool the pouch-type battery cell.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell assembly, comprising:
   a pouch battery cell having an external pouch housing and first and second electrical terminals extending from the external pouch housing; the external pouch housing having a central housing pouch portion and a peripheral lip member extending around a periphery of the central housing pouch portion; the peripheral lip member having a first peripheral lip pouch portion with a first extension pouch portion, a first arcuate-shaped pouch portion, and a first end pouch portion; the first extension pouch portion extending outwardly from the central housing pouch portion in a first direction, the first arcuate-shaped pouch portion being coupled to and between the first extension pouch portion and the first end pouch portion; and
   a first tube contacting the first extension pouch portion and the first arcuate-shaped pouch portion of the peripheral lip member of the external pouch housing, the first arcuate-shaped pouch portion being wrapped around a portion of a periphery of a first tube portion of the first tube, the first end pouch portion of the peripheral lip pouch portion of the peripheral lip member having a weld interface with a top surface of the first extension pouch portion such that the first peripheral lip pouch portion extends 360 degrees to define and enclose a first interior space that is sized and shaped to receive the first tube portion of the first tube therein, and the first tube portion of the first tube being disposed within the first interior space; and wherein the external housing is constructed of a sheet, the sheet being formed by laminating a polymer film on a metal sheet made of aluminum.

2. The battery cell assembly of claim 1, wherein the first tube is configured to receive heat energy from the pouch battery cell and to transfer at least a portion of the received heat energy to a fluid flowing through the first tube to cool the pouch battery cell.

3. The battery cell assembly of claim 1, wherein an end portion of the first tube extends outwardly from the peripheral lip member and is not enclosed by the peripheral lip member.

4. The battery cell assembly of claim 1, wherein the peripheral lip member further includes second, third and fourth peripheral lip pouch portions, the first and second peripheral lip pouch portions extending substantially parallel to one another, the third and fourth peripheral lip pouch portions extending substantially parallel to one another and substantially perpendicular to the first and second peripheral lip pouch portions.

5. The battery cell assembly of claim 4, wherein the first tube comprises first, second, and third tube portions, the first and second tube portions extending substantially parallel to one another, the third tube portion extending between the first and second tube portions substantially perpendicular to the first and second tube portions.

6. The battery cell assembly of claim 5, wherein the second tube portion of the first tube being disposed against and contacting the second peripheral lip pouch portion of the peripheral lip member of the external pouch housing of the pouch battery cell, the second peripheral lip pouch portion of the peripheral lip member of the pouch battery cell having a second extension pouch portion, a second arcuate-shaped pouch portion, and a second end pouch portion; the second extension pouch portion extending outwardly from the central housing pouch portion in a second direction opposite to the first direction, the second arcuate-shaped pouch portion being coupled to and disposed between the second extension pouch portion and the second end pouch portion; and the second arcuate-shaped pouch portion of the second peripheral lip pouch portion of the peripheral lip member of the pouch battery cell being disposed against and wrapped around a portion of a periphery of a second tube portion of the first tube, the second end pouch portion being further coupled to a top surface of the second extension pouch portion such that the second peripheral lip pouch portion defines a second interior space that is sized and shaped to receive the second tube portion of the first tube therein, and the second tube portion of the first tube being disposed within the second interior space.

7. The battery cell assembly of claim 6, wherein the third tube portion of the first tube is disposed against the third peripheral lip pouch portion of the peripheral lip member of the external pouch housing, the third peripheral lip pouch portion being disposed against and wrapped around a portion of a periphery of the third tube portion such that the third tube portion is at least partially disposed within a third interior space defined by the third peripheral lip pouch portion.

8. The battery cell assembly of claim 4, wherein the first and second electrical terminals extend outwardly from the fourth peripheral lip pouch portion of the peripheral lip member.

9. The battery cell assembly of claim 1, wherein the first end pouch portion of the first peripheral lip pouch portion is coupled to the top surface of the first extension pouch portion of the first peripheral lip pouch portion proximate to the central housing pouch portion.

10. The battery cell assembly of claim 1, wherein the first tube is an aluminum tube.

11. The battery cell assembly of claim 1, further comprising a second tube being disposed against and contacting the peripheral lip member of the external pouch housing of the pouch battery cell, the peripheral lip member of the pouch battery cell having a second peripheral lip pouch portion; the second peripheral lip pouch portion of the peripheral lip member of the pouch battery cell having a second extension pouch portion, a second arcuate-shaped pouch portion, and a second end pouch portion; the second extension pouch portion extending outwardly from the central housing pouch portion in a second direction opposite to the first direction, the second arcuate-shaped pouch portion being coupled to and disposed between the second extension pouch portion and the second end pouch portion; and the second arcuate-shaped pouch portion of the second peripheral lip pouch portion of the peripheral lip member of the pouch battery cell being disposed against and wrapped around a portion of a periphery of a first tube portion of the second tube, the second end pouch portion being further coupled to a top surface of the second extension pouch portion such that the second peripheral lip pouch portion defines a second interior space that is sized and shaped to receive the first tube portion of the second tube therein, and the first tube portion of the second tube being disposed within the second interior space.

12. The battery cell assembly of claim 11, wherein the second tube is configured to receive heat energy from the pouch battery cell and to transfer at least a portion of the received heat energy to a fluid flowing through the second tube to cool the pouch battery cell.

13. The battery cell assembly of claim 11, wherein the first and second peripheral lip pouch portions extending substantially parallel to one another, the central housing pouch portion being disposed between the first and second peripheral lip pouch portions.

14. The battery cell assembly of claim 13, wherein the peripheral lip member further includes third and fourth peripheral lip pouch portions extending substantially parallel to one another and substantially perpendicular to the first and second peripheral lip pouch portions, the first and second electrical terminals extending outwardly from the third and fourth peripheral lip pouch portions, respectively.

15. The battery cell assembly of claim 1, wherein:

the top surface of the first extension pouch portion extending outwardly from the central housing pouch portion in the first direction and extending parallel to a top surface of the central housing pouch portion; and the first end pouch portion having a first surface being coupled to the top surface of the first extension pouch portion and parallel to the top surface of the central housing portion.

16. A battery cell assembly, comprising:

a pouch battery cell having an external pouch housing and first and second electrical terminals extending from the external pouch housing; the external pouch housing having a central housing pouch portion and a peripheral lip member being coupled to and disposed around a periphery of the central housing pouch portion; the peripheral lip member having a first peripheral lip pouch portion with a first extension pouch portion, a first arcuate-shaped pouch portion, and a first end pouch portion; the first extension pouch portion extending outwardly from the central housing pouch portion in a first direction, the first arcuate-shaped pouch portion being coupled to and between the first extension pouch portion and the first end pouch portion; and a first tube contacting the first extension pouch portion and the first arcuate-shaped pouch portion of the peripheral lip member of the external pouch housing, the first arcuate-shaped pouch portion being wrapped around a portion of a periphery of a first tube portion of the first tube, and the first end pouch portion having a weld interface with a top surface of the first extension pouch portion such that the first peripheral lip pouch portion extends 360 degrees to define and enclose a first interior space that is sized and shaped to receive the first tube portion of the first tube therein, and the first tube portion of the first tube being disposed within the first interior space.

17. The battery cell assembly of claim 16, wherein:

the top surface of the first extension pouch portion extending outwardly from the central housing pouch portion in the first direction and extending parallel to a top surface of the central housing pouch portion; and the first end pouch portion having a first surface being coupled to the top surface of the first extension pouch portion and parallel to the top surface of the central housing portion.

18. A battery cell assembly, comprising:

a pouch battery cell having a central housing pouch portion and a peripheral lip member and first and second electrical terminals being coupled to the peripheral lip member, the peripheral lip member being coupled to and disposed around a periphery of the central housing pouch portion;

the peripheral lip member having a first peripheral lip pouch portion with a first extension pouch portion, a first arcuate-shaped pouch portion, and a first end pouch portion; the first extension pouch portion having a top surface extending outwardly from the central housing pouch portion in a first direction that is parallel to a top surface of the central housing pouch portion, the first arcuate-shaped pouch portion being coupled to and disposed between the first extension pouch portion and the first end pouch portion; and a first tube contacting the first extension pouch portion and the first arcuate-shaped pouch portion of the peripheral lip member, the first arcuate-shaped pouch portion being wrapped around a portion of a periphery of a first tube portion of the first tube, and the first end pouch portion having a first surface being coupled to the top surface of the first extension pouch portion and parallel to the central housing pouch portion such that the first peripheral lip pouch portion extends 360 degrees to define and enclose a first interior space that is sized and shaped to receive the first tube portion of the first tube therein, and the first tube portion of the first tube being disposed within the first interior space.

19. The battery cell assembly of claim 18, wherein:

the first end pouch portion of the peripheral lip pouch portion of the peripheral lip member having a weld interface with the top surface of the first extension pouch portion.

* * * * *